United States Patent [19]
Pieper

[11] 3,991,504
[45] Nov. 16, 1976

[54] FISHING LURE

[76] Inventor: Curtis A. Pieper, 1016 N. 22nd St., Fort Dodge, Iowa 50501

[22] Filed: June 16, 1975

[21] Appl. No.: 586,985

[52] U.S. Cl. ............................................. 43/42.06
[51] Int. Cl.² ......................................... A01K 85/00
[58] Field of Search ......................... 43/42.06, 42.1

[56] References Cited
UNITED STATES PATENTS

| | | | |
|---|---|---|---|
| 2,091,457 | 8/1937 | Sauer | 43/42.06 |
| 2,306,181 | 12/1942 | Neumann | 43/42.1 |
| 2,797,517 | 7/1957 | Eriksen | 43/42.06 |
| 3,151,413 | 10/1964 | Witz | 43/42.1 |

*Primary Examiner*—Warner H. Camp
*Attorney, Agent, or Firm*—Zarley, McKee, Thomte & Voorhees

[57] ABSTRACT

An elongated resilient and pliable worm-like in appearance sleeve is positioned on the free end of a fishline and a hook engaging the line has its shank extending into the outer end of the sleeve with the barb portions extending rearwardly along the peripheral side of the sleeve. The line extends along the longitudinal center of the sleeve and out the rear end which is open and may be closed by a bead movable along the line. Emulsified fish bait may be placed in the sleeve through the open end through use of a squeeze-type dispensing bottle. The sleeve includes a plurality of outlet openings in its side wall through which the bait is dispensed during use. Action of the sleeve on the line during use causes the line to agitate the bait material and facilitate its being dispensed through the outlet openings.

8 Claims, 4 Drawing Figures

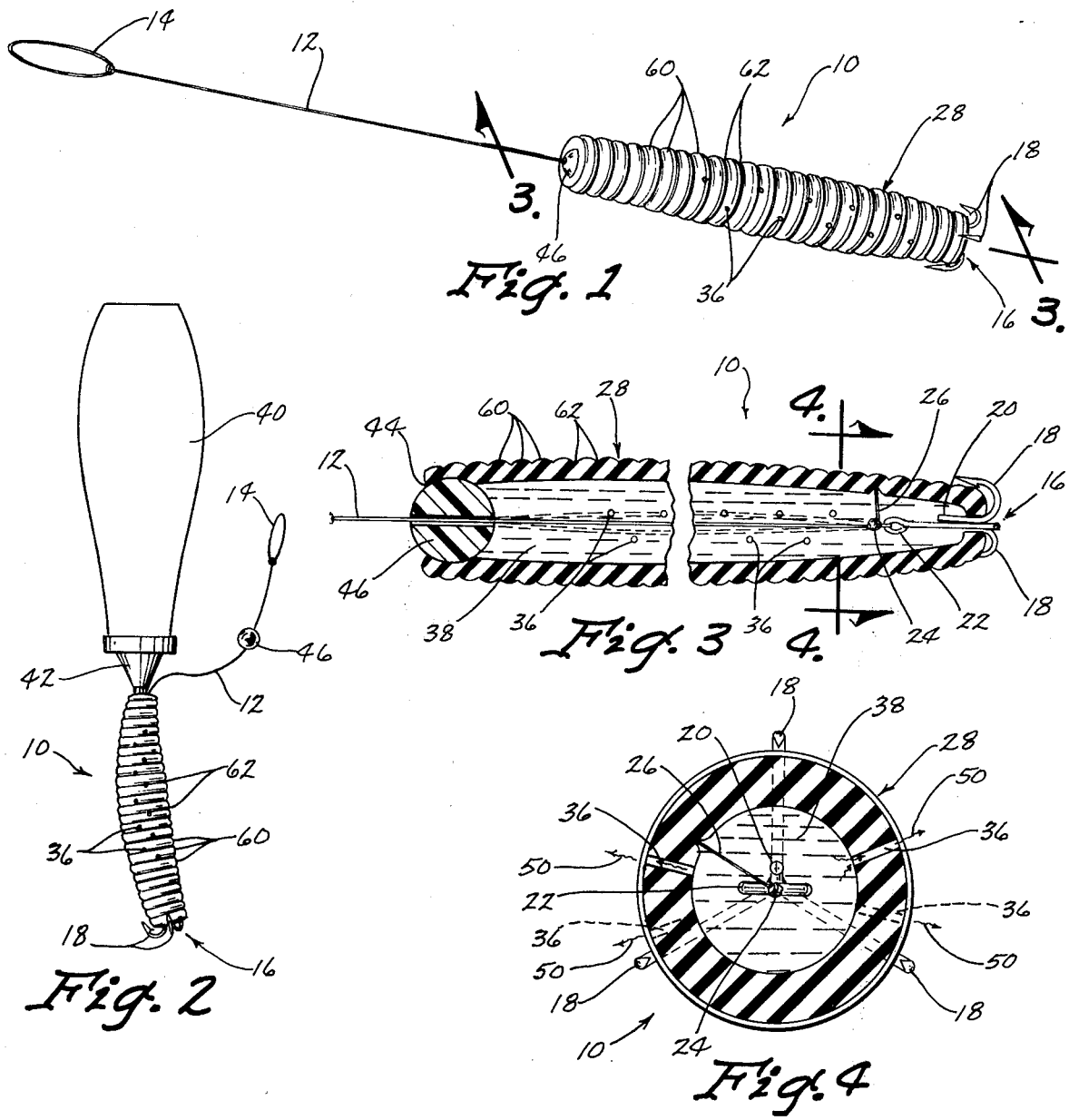

FISHING LURE

BACKGROUND OF THE INVENTION

There has long been a need for a fish lure that combines the qualities of natural bait with those of artificial lures and yet is simple to use and effective in catching fish. Most lures have one or more characteristics that make them inconvenient and/or ineffective to use. A fish lure must have all the advantages of natural and artificial lures to be successful with both the fish and the fishermen.

SUMMARY OF THE INVENTION

The fish lure of this invention utilizes the soft pliable and flexible plastic material in the elongated worm-like sleeve positioned on the free end of a fishing line or leader with the shank of the fishhook extending from within the forward end of the sleeve out through the end with the barbed portion extending rearwardly along the outer peripheral side of the sleeve. The opposite end of the sleeve is open for filling the sleeve with emulsified fish bait material suitable for the fish being sought. A bead is carried on the fishing line or leader for being moved into the open end of the sleeve to close it and prevent onrushing water from entering the sleeve thereby causing the fish bait in the sleeve to be dispensed too rapidly through outlet openings provided along the sleeve's substantial length. The bait material in the sleeve is maintained in an agitated state by action of the fishing line moving radially outwardly from the longitudinal center toward the side walls as the fish lure is moved through the water.

DESCRIPTION OF THE DRAWINGS

FIG. 1 is a perspective view of the fish lure of this invention;

FIG. 2 is a side elevation view thereof showing the fish lure being filled with an emulsified bait material;

FIG. 3 is a cross sectional view taken along line 3 — 3 in FIG. 1; and

FIG. 4 is a cross sectional view taken along line 4 — 4 in FIG. 3.

DESCRIPTION OF THE INVENTION

The fish lure of this invention is referred to in FIG. 1 generally by the reference numeral 10 and includes a leader 12 having a loop 14 in its inner end for connection to a fishline not shown. A fishhook 16 is carried on the outer free end and includes three barbs 18 connected to centrally positioned shank 20. Shank 20 is connected through an eye 22 to the leader 12 by a knot 24 having a free end 26.

A worm-like sleeve 28 elongated and hollow and made of soft pliable and flexible plastic material is positioned on the leader 12 with the shank 20 of the fishhook 16 extending into an opening 30 in the forward end of the sleeve 28. The sleeve material sealingly engages the shank 20 and the free end 26 of the leader 12 is sufficiently rigid to engage the side wall of the sleeve to assist in anchoring the fishhook 16 in the forward end of the sleeve. The barbs 18 are uniformly positioned around the forward end of the sleeve and extend rearwardly therealong closely adjacent to the outer surface of the sleeve.

Sleeve 28 includes a plurality of outlet openings 36 along its substantial length for dispensing an emulsified bait material 38 which is placed in the interior of the sleeve through use of a dispensing bottle 40 of the squeeze type having a nozzle 42 which fits into the open end 44 of the sleeve as seen in FIG. 2. The bottle is merely squeezed by the fisherman for ejecting the liquid bait into the sleeve.

A bead 46 carried on the leader 12 is movable, if desired, into the open end 44 to close it to admission of water for mixing with the bait, as seen in FIG. 3.

During use, the fish lure 10 will be pulled through the water by the leader 12 connected to a fishline and the lateral movement of the leader 12 in the sleeve will tend to stir up the bait 38 and facilitate its being dispensed through the openings 36, as seen by the arrows 50, in FIG. 4. If desired, bead 46 may be left out of the open end of the sleeve to facilitate faster disbursement of the bait material as the water will tend to force the bait out through the outlet openings as the lure moves along in the water.

It is seen that the lure of this invention has all the characteristics of natural bait along with those of artificial lures. The lure has the scent of natural bait from the emulsified bait material inside the sleeve and the sleeve itself has all the appearances of a nightcrawler or worm due to its elongated pliable shape and material. It is further seen that the sleeve includes a plurality of longitudinally spaced transversely extending ridges 60 alternating with grooves 62 to further give the appearance of a worm. The dispensing of the bait material is controlled through use of the bead 46 as a cork in the open end of the sleeve and agitation of the line 12 within the sleeve further facilitates dispensing of the bait material. The hook is maintained in the sleeve in sealing engagement with the closed end of the sleeve and by the anchoring action of the free end of the leader engaging the side wall.

A further advantage of this invention is that the same lure can be used for different fishing in that different squeezetype bottles of emulsified bait can be readily maintained and easily dispensed into the lure as desired by inserting the nozzle end of the bottle into the open rear end of the sleeve. Upon completion of the fishing the lure may be readily cleaned by washing it under a water faucet or in the body of water being fished whereupon the lure will be ready for the next fishing which may include fishing for a different type of fish and the use of a different emulsified bait material.

What is claimed is:

1. A fishing lure comprising,
   a fishing line having a hook at one end, said hook having a J-shaped shank and barb portion,
   an elongated flexible and resilient sleeve on said line with the rear end of said sleeve nesting in the J-shaped shank and barb portion of said hook, the other end of said line extending outwardly of the forward end of said sleeve,
   said sleeve having a restricted opening at its rearward end substantially closed by said shank extending therethrough, said sleeve being internally open along its length and at its forward end and adapted to receive emulsified fish bait through said forward opening, said sleeve having openings along its length for dispensing said fish bait during use, and
   a bead movably carried on said line and adapted to be positioned in said forward opening and be yieldably frictionally held in said opening by the side wall of said sleeve.

2. The structure of claim 1 wherein said fish hook includes a plurality of barbs uniformly disposed around the periphery of the rearward end of said sleeve and extending forwardly therealong.

3. The structure of claim 1 wherein said sleeve is sufficiently large in diameter for said fish line to move laterally therein and stir up said bait for dispensing through said openings as said fish lure is moved through the water by said fish line.

4. The structure of claim 1 wherein said rearward one end of said sleeve sealingly engages the shank of said hook.

5. The structure of claim 4 wherein said fish line includes a free end portion extending laterally in said sleeve and being sufficiently rigid to engage said sleeve and anchor said hook therein.

6. The struture of claim 1 wherein said sleeve is formed of soft plastic material, said shape and material giving the fish lure the appearance of a worm.

7. The structure of claim 6 wherein said sleeve includes a plurality of exterior, annular transversely extending alternating ridges and grooves along its substantial length.

8. A fishing lure comprising, a fishing line having a hook at one end, said hook having a shank and barb portion, an elongated flexible and resilient sleeve on said line with said line extending along the longitudinal axis of said sleeve and with said hook shank extending from said one end of said line outwardly of said sleeve through one end with said barb extending rearwardly along said sleeve on the outside thereof, said fish line including a free end portion extending laterally in said sleeve and being sufficiently rigid to engage said sleeve and anchor said hook therein, said sleeve being open at its opposite end from said hook and adapted to receive emulsified fish bait, said sleeve having openings along its length for dispensing said fish bait during use, and said sleeve at its rearward end sealingly engaging said shank, and a bead carried on said line and adapted to be positioned in said opening in said sleeve to limit admission of water into said sleeve during use.

* * * * *